(12) United States Patent
Nichols et al.

(10) Patent No.: US 12,264,919 B2
(45) Date of Patent: Apr. 1, 2025

(54) HEAD MOUNTED DISPLAY SYSTEM

(71) Applicant: BAE SYSTEMS plc, London (GB)

(72) Inventors: Mark Nichols, Rochester (GB); Owen Edward Jones, New Malden (GB); Daniel Martyn Forrester, New Malden (GB); Derek Ron Jordan, Rochester Kent (GB)

(73) Assignee: BAE SYSTEMS PLC, London (GB)

( * ) Notice: Subject to any disclaimer, the term of this patent is extended or adjusted under 35 U.S.C. 154(b) by 741 days.

(21) Appl. No.: 17/296,631

(22) PCT Filed: Dec. 3, 2019

(86) PCT No.: PCT/GB2019/053414
§ 371 (c)(1),
(2) Date: May 25, 2021

(87) PCT Pub. No.: WO2020/115469
PCT Pub. Date: Jun. 11, 2020

(65) Prior Publication Data
US 2022/0026218 A1 Jan. 27, 2022

(30) Foreign Application Priority Data

Dec. 6, 2018 (GB) .................................... 1819895
Jan. 8, 2019 (EP) .................................... 19150822

(51) Int. Cl.
*G01C 21/20* (2006.01)
*G06F 3/01* (2006.01)
*G06T 19/00* (2011.01)

(52) U.S. Cl.
CPC ........... *G01C 21/203* (2013.01); *G06F 3/012* (2013.01); *G06F 3/013* (2013.01); *G06T 19/006* (2013.01)

(58) Field of Classification Search
CPC ....... G01C 21/203; G01C 21/00; G06F 3/012; G06F 3/013; G06F 3/011; G06T 19/006;
(Continued)

(56) References Cited

U.S. PATENT DOCUMENTS 9,269,239 B1 * 2/2016 Jensen ...................... G08B 5/22
9,751,607 B1 * 9/2017 Kollmann .............. B63H 5/125
(Continued)

FOREIGN PATENT DOCUMENTS

EP    3177010 A1    6/2017
EP    3363509 A1    8/2018
(Continued)

OTHER PUBLICATIONS

International Search Report and Written Opinion received for PCT Application No. PCT/GB2019/053414. Mail date: Feb. 6, 2020. 14 pages.
(Continued)

*Primary Examiner* — Isaac G Smith
*Assistant Examiner* — Nikki Marie M Molina
(74) *Attorney, Agent, or Firm* — Finch & Maloney PLLC

(57) ABSTRACT

A head mounted display system for use on a watercraft is disclosed. The head mounted display system comprises circuitry to determine orientation information of a head mounted display system relative to the watercraft and a display configured to superimpose graphical information over objects in a field of view of at least one eye of a user of the head mounted display system. The graphical information is based on sensor data and the orientation information of the head mounted display. The sensor data is provided by at least one data source associated with the watercraft.

19 Claims, 12 Drawing Sheets

(58) Field of Classification Search
CPC .......... G06T 2207/30248; B63B 49/00; G02B 27/017; G05D 1/0038; G05D 1/0044
See application file for complete search history.

(56) References Cited

U.S. PATENT DOCUMENTS

| | | | |
|---|---|---|---|
| 9,891,705 | B1 | 2/2018 | Ahr et al. |
| 10,223,805 | B1 | 3/2019 | Trail |
| 2003/0210228 | A1* | 11/2003 | Ebersole .............. G02B 27/017 345/157 |
| 2004/0102676 | A1 | 5/2004 | Brendley et al. |
| 2008/0048931 | A1* | 2/2008 | Ben-Ari .................. G01S 5/163 345/8 |
| 2013/0278635 | A1 | 10/2013 | Maggiore |
| 2016/0088417 | A1 | 3/2016 | Kim et al. |
| 2016/0252352 | A1 | 9/2016 | Miller |
| 2017/0045941 | A1 | 2/2017 | Tokubo et al. |
| 2018/0176545 | A1 | 6/2018 | Aflaki Beni |
| 2018/0259338 | A1* | 9/2018 | Stokes ...................... G06T 7/70 |
| 2019/0035152 | A1 | 1/2019 | Kazansky |
| 2022/0026710 | A1 | 1/2022 | Moore et al. |

FOREIGN PATENT DOCUMENTS

| | | |
|---|---|---|
| EP | 3395668 A1 | 10/2018 |
| GB | 2561852 A | 10/2018 |
| WO | 2017042588 A1 | 3/2017 |
| WO | 2018227098 A1 | 12/2018 |
| WO | 2018232093 A1 | 12/2018 |
| WO | 2019143793 A1 | 7/2019 |
| WO | 2020024909 A1 | 2/2020 |
| WO | 2020115466 A1 | 6/2020 |
| WO | 2020115469 A1 | 6/2020 |

OTHER PUBLICATIONS

Search Report under Section 17(5) received for GB Application No. 1819895.2, dated May 29, 2019. 3 pages.
Combined Search and Examination Report under Sections 17 and 18(3) received for GB Application No. 1917645.2, dated Mar. 5, 2021. 6 pages.
Extended European Search Report received for EP Application No. 19150822.5, dated Jul. 8, 2019. 9 pages.
Netherlands Maritime University, "Augmented reality used in navigation, Project 2 Theme: improvement and Innovation," February 5, 20113. 25 pages.
International Preliminary Report on Patentability received for PCT Application No. PCT/GB2019/053411. Issue date: Jun. 8, 2021. 9 pages.
International Preliminary Report on Patentability received for PCT Application No. PCT/GB2019/053414. Issue date: Jun. 8, 2021. 7 pages.
International Search Report and Written Opinion received for PCT Application No. PCT/GB2019/053411. Mail date: Feb. 11, 2020. 16 pages.
Search Report under Section 17(5) received for GB Application No. 1819896.0, dated May 30, 2019. 4 pages.
Combined Search and Examination Report under Sections 17 and 18(3) received for GB Application No. 1917648.6 dated Jun. 3, 2020. 6 pages.
Extended European Search Report received for EP Application No. 19150823.3, dated Jul. 1, 2019. 8 pages.

\* cited by examiner

HEAD MOUNTED DISPLAY SYSTEM

BACKGROUND

A user on a watercraft may be presented information on various screens and displays. However, these may require the user to look away from an outside scene, or restrict their view of the outside scene.

DETAILED DESCRIPTION

A user of a watercraft may have a desire to be able to observe information regarding objects and scenery around the watercraft. A heads up display is a system where information is presented over a scene on a display, such that that the scene and information is viewable to the user. However, this necessitates the user looking through a particular window or screen at a fixed location on the watercraft, so the view is restricted.

A head mounted display, sometimes known as a head wearable display, is a display that allows a user to view a scene and have information from a display of the screen overlaid onto the scene. The use of a head mounted display allows the user to look in unrestricted or substantially unrestricted directions.

Figure 1:
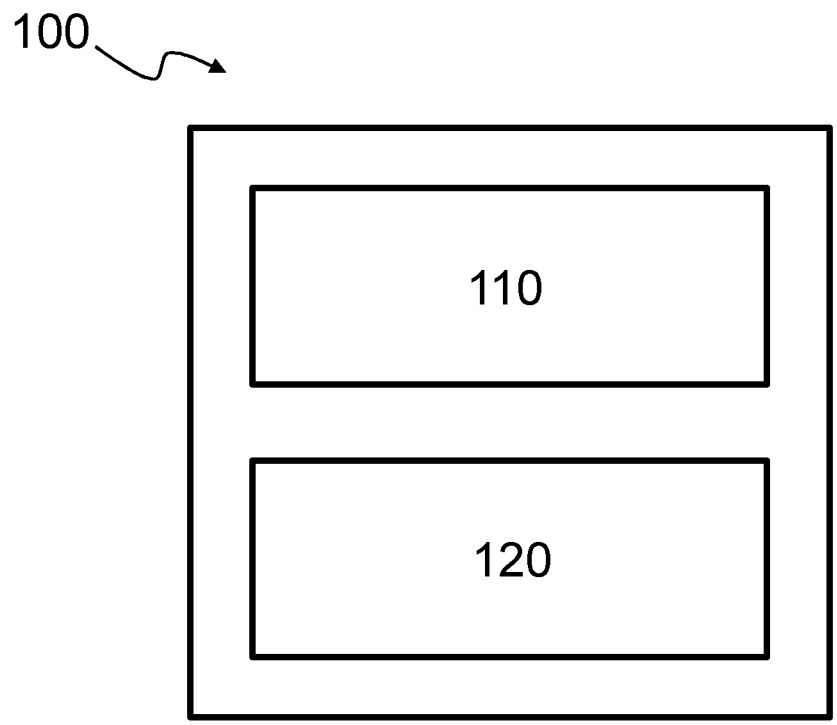
FIG. 1 illustrates a head mounted display system according to some examples.

FIG. 1 illustrates a head mounted display system 100 according to some examples. The head mounted display system 100 comprises orientation circuitry 110 to determine orientation information of the head mounted display system 100 relative to the watercraft; and a display 120 configured to superimpose graphical information over objects in the field of view of at least one eye of a user of the head mounted display system, the graphical information based on sensor data and the orientation information of the head mounted display, the sensor data provided by at least one data source associated with the watercraft.

The head mounted display system 100 may allow the user to receive information while being free to move around the watercraft and view the scene in multiple directions and positions. Furthermore, the use of a head mounted display system may allow the user to view the outside scenery even if they do not have a direct line of sight, such as if their view is obscured by the hull or other obstruction.

Figure 2:
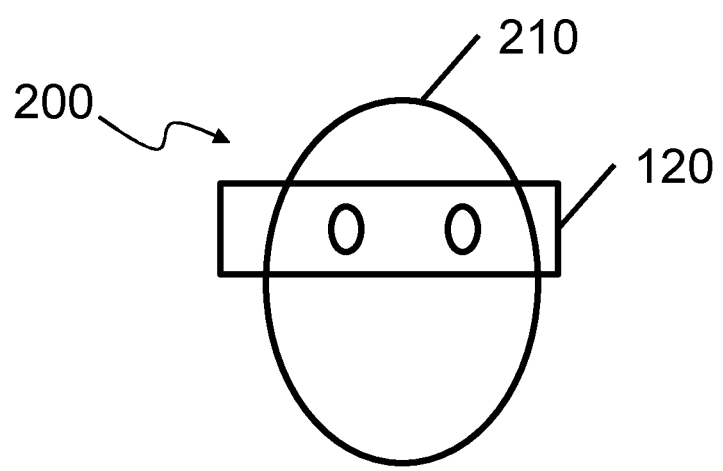
FIG. 2 illustrates a head mounted display according to some examples.

FIG. 2 illustrates a head mounted display 200 according to some examples. The head mounted display 200 may form part of the head mounted display system 100. Head mounted display 200 comprises a display 120, the display configured to display information over a scene to at least one eye of the user. The display is mounted to the head 210, for example by using a helmet, glasses or other means of attachment. The orientation circuitry 110 may be fully contained in the head mounted display 200, or may be partially or fully separate to the head mounted display 200. Positioning the orientation circuitry 110 fully or partially separate to the head mounted display may enable the size of the head mounted display to be reduced by allowing for the calculation of the position, orientation and suitable graphical information to be calculated at a separate location, such as a server located on the watercraft.

The orientation circuitry 110 determines the orientation of the user's head and eyes, and the position of the user of the head mounted display 200. In some examples the orientation circuitry 110 may also determine the gaze directions of the user's eyes such that it may determine where the user is looking at.

The display 120 may be configured to superimpose graphical information related to at least one object in the vicinity of the head mounted display system 100. Examples of the type of graphical information that may be displayed is illustrated in FIGS. 3-7 by various different scenes. It is to be understood that a combination of the type of the graphical information shown in FIGS. 3-7 may be presented to the user. The graphical information is based on sensor data from the watercraft, such as information from radar, sonar, Global Navigation Satellite Systems, and/or any other type of sensor system associated with the watercraft.

The display 120 is illustrated as covering both eyes of the user, but it may only cover a single eye in a monocular arrangement. The display 120 may be a screen such that the image is formed on the screen, or may comprise a projector to project the image onto the user's eye or eyes. The display 120 may comprise any other suitable arrangement.

Figure 3:
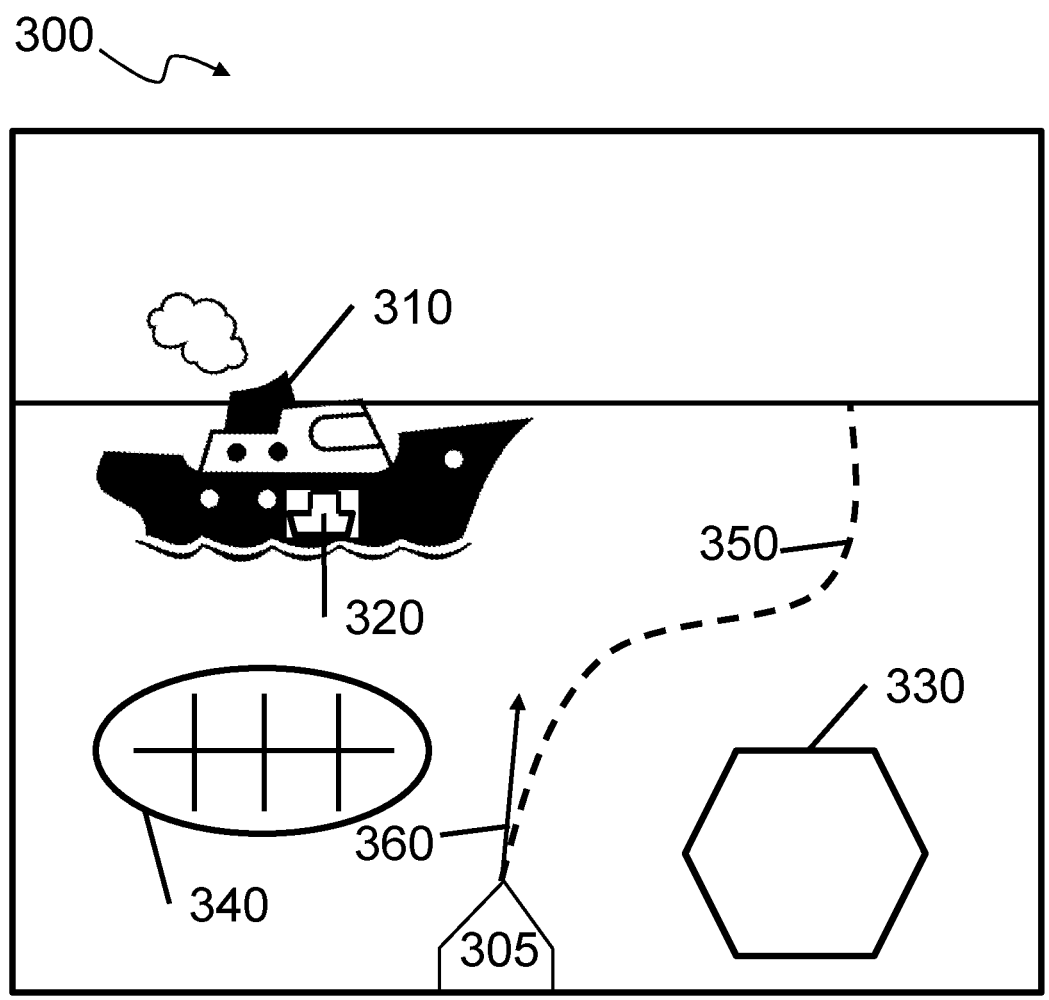
FIG. 3 illustrates a predicted path scene viewed through a head mounted display according to some examples.

FIG. 3 illustrates a predicted path scene 300 viewable by a user of the head mounted display system 100. The predicted path scene 300 comprises a real watercraft 310 viewable in the scene, and a portion 305 of the user watercraft the user is located on. The real watercraft 310 is a real object rather than an image of the real watercraft 310. The head mounted display system 100 is configured to overlay graphical information over features of interest.

The head mounted display system 100 is configured to overlay graphical information comprising watercraft identification information 320 over the real watercraft 310. The head mounted display system 100 is also configured to overlay graphical information comprising hazard warnings over areas of potential hazards. Surface hazard marker 330 may be overlaid over a surface hazard, such as a buoy. Sub-surface hazard marker 340 may be overlaid over a hazard under the surface, such as an area of low depth or any other undersea obstruction.

A processing means associated with the watercraft may calculate a suggested path 350 to avoid the potential hazards, and the suggested path may be displayed on display 120. Predicted path scene 300 also comprises a current heading 360 of the real watercraft.

The portion 305 of the user watercraft may be the portion that is viewable by the user of the head mounted display system 100 such that the portion 305 is a real object, or may be displayed on display 120 such that the portion 305 is in image.

The graphical information displayed in predicted path scene 300 may allow a user of the watercraft to avoid hazards in a convenient manner, increasing the safety of the vessel and operational efficiency of the user.

Figure 4:
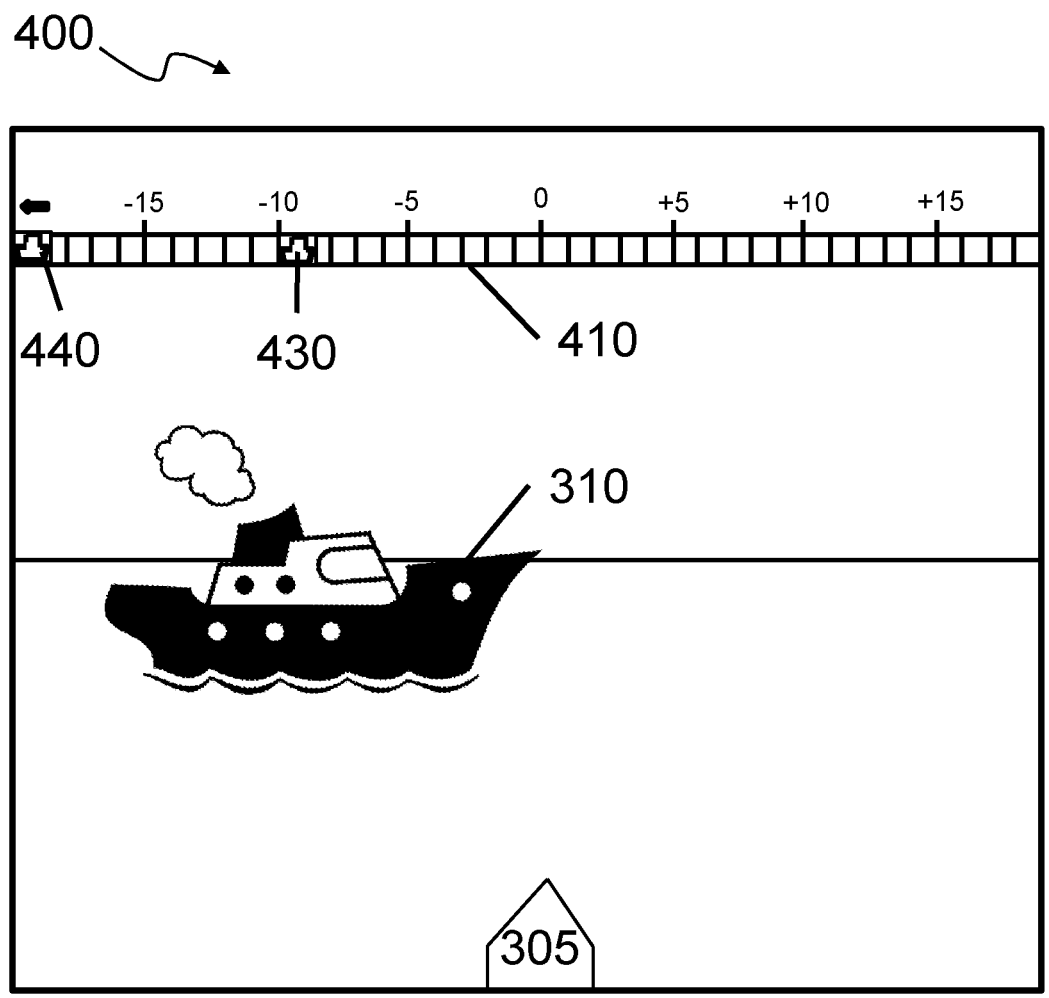
FIG. 4 illustrates a head gaze information scene viewed through a head mounted display according to some examples.

FIG. 4 illustrates a head gaze information scene 400 in accordance with some examples. Head gaze information scene 400 comprises a portion 305 of the watercraft the user is located on, a real watercraft 310, and graphical information comprising a head gaze information bar 410. The head gaze information bar 410 is displayed on display 120 such that it is fixed to the scenery and does not move relative to the outside scenery when the user moves their head, or when the watercraft moves.

The head gaze information bar 410 may comprise information regarding the gaze direction of the user. For example, the head gaze information bar 410 may show bearing information, such that the user is able to easily identify the bearing of a feature of interest. FIG. 4 also illustrates that the head gaze information bar 410 may also comprise a watercraft marker 430, which indicates the bearing of a particular real watercraft 310 located in the scene. Any other feature of interest may also be indicated on the information bar 410, for example a surface hazard marker 330 or a sub-surface hazard marker 340. The head gaze information bar 410 may indicate what bearing the user is currently looking at.

The head gaze information bar 410 also comprises an off-view marker 440 and an indicating arrow. The off-view marker 440 and indicating arrow may indicate that a watercraft or any other feature of interest is outside of the field of view of the user. The off-view marker 440 may also comprise a field indicating the bearing that the feature of interest is located on. The field may comprise an arrow or other marker, wherein the size of the arrow indicates the relative amount the user is required to turn their head to see the feature of interest, or may comprise a number indicating a bearing of the feature of interest. In some examples it may comprise a combination of the aforementioned markers.

The bearing may be an absolute bearing, such that it is given relative to true north, or may be a relative bearing, where the user is able to choose the location of the reference. The bearing may also be any other suitable type of bearing or heading.

Figure 5:
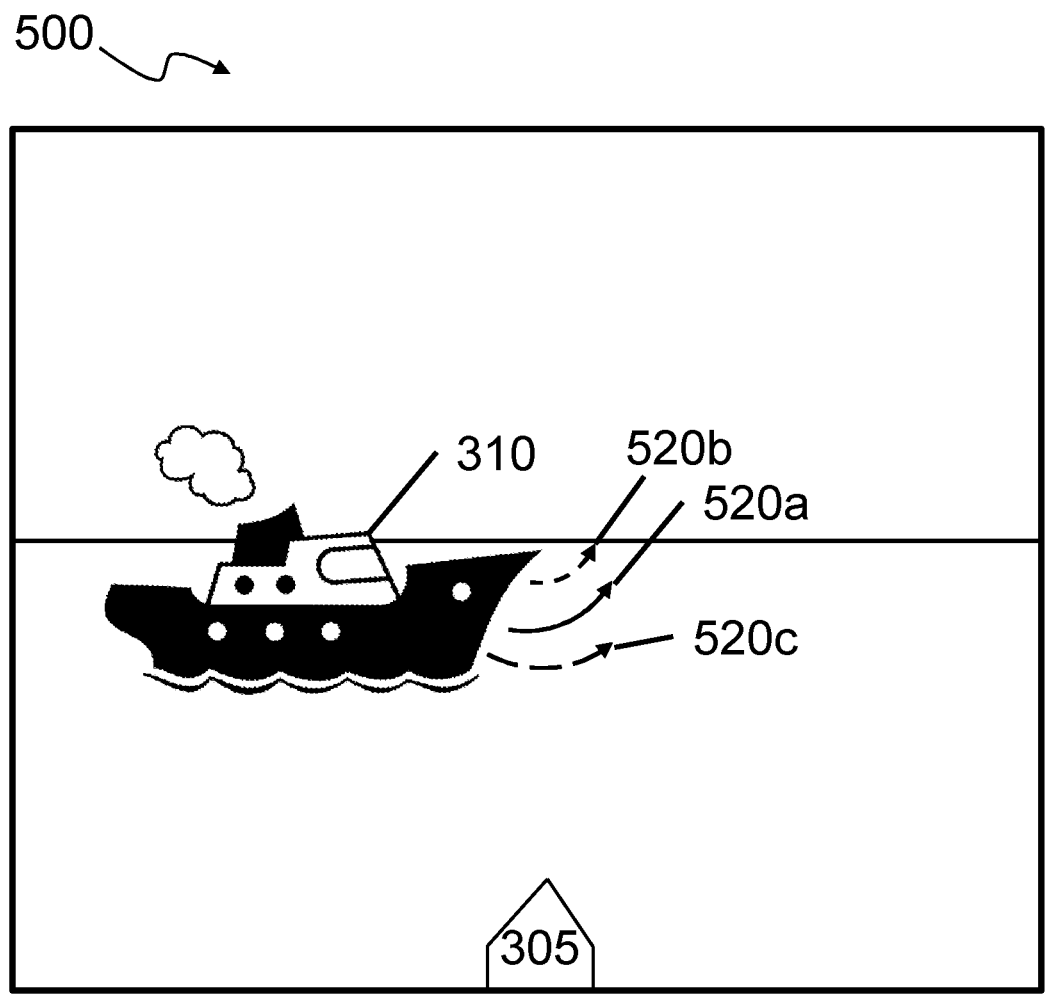
FIG. 5 illustrates an awareness scene viewed through a head mounted display according to some examples.

FIG. 5 illustrates a predicted path scene 500. FIG. 5 comprises a feature of interest, in this case a real watercraft 310. The path of the feature of interest may be predicted based at least on the previous movement of the feature of interest, current heading, and current velocity. FIG. 5 illustrates that the predicted path 520a-c may be displayed by display 120. The prediction may have an average predicted path 520a, and outside predicted paths 520b and 520c. This allows the user of the head mounted display system 100 to see the range of paths the feature of interest might take. The feature of interest may be any object, and is not limited to objects on the surface of the water, for example the feature of interest may be substantially below the surface of the water, substantially on the surface of the water, on land or in the air.

If there are more than one features of interest, then a predicted path may be shown for each of the features of interest. If two or more of the predicted paths overlap, then a warning may be given to the user of the head mounted display system 100. A warning may also be given if the predicted path of the feature of interest overlaps with the current heading or current planned route of the watercraft the user is located on. The warning may be a visual warning shown at the location of the overlap. The warning may also take into account the velocity of the features of interest, and such that a warning is given if the features of interest are likely to collide based on their velocity, and no warning or a different warning is given if the paths cross but the features of interest are not likely to collide based on their velocities.

Figure 6:
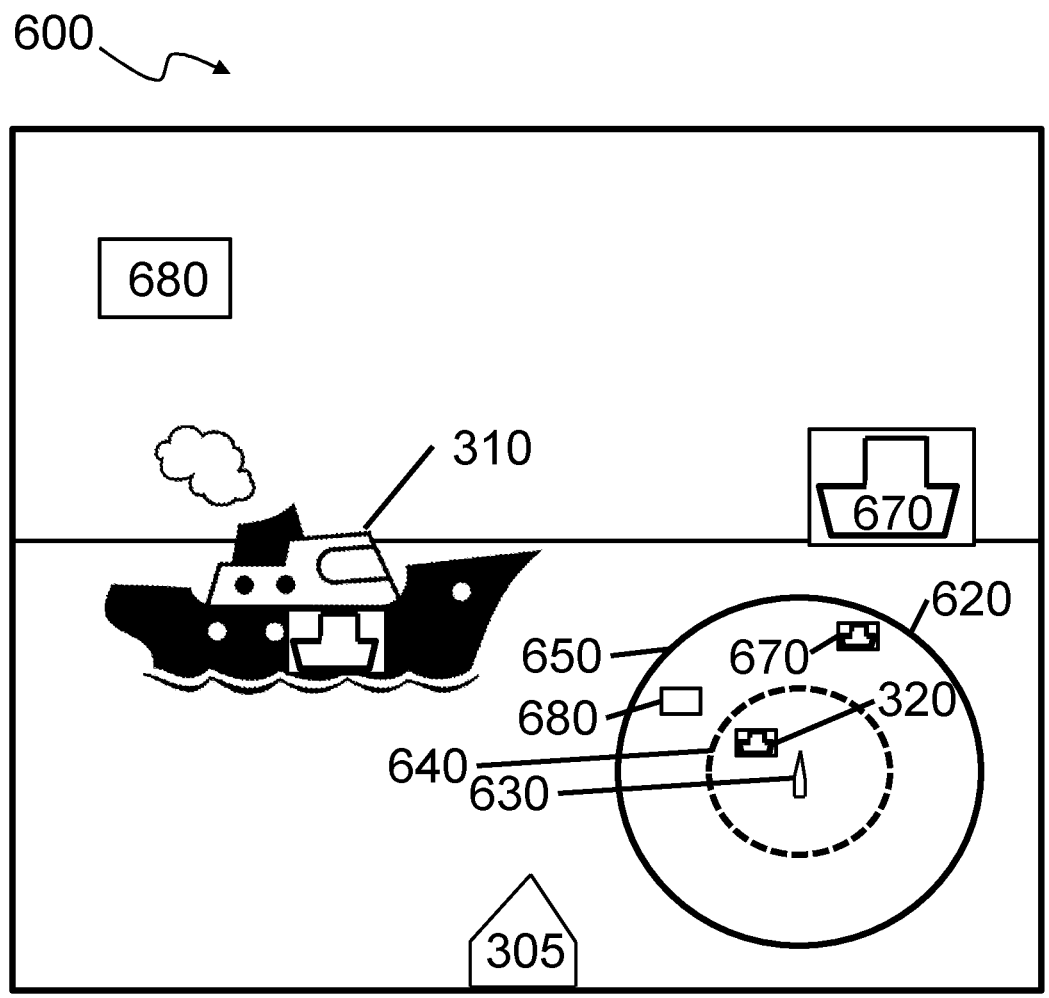
FIG. 6 illustrates a scene viewed through a head mounted display according to some examples.

FIG. 6 illustrates an awareness scene 600. Real watercraft 310 is viewable in the scene. The scene comprises features of interest which are not currently viewable by the user of the head mounted display system 100, such as a watercraft 670 and an aircraft 680. Watercraft 670 may be not viewable to the user as it is beyond the horizon. Aircraft 680 may be too far away for the user to see using their eyes alone. There may be markers indicated at the bearing and elevation that the feature of interest is located equivalent to a line of sight that the feature of interest is located on.

Awareness scene 600 also comprises an awareness plot 620. Awareness plot 620 indicates positions of features of interest relative to the location of the watercraft the user is located on, indicated by icon 630. Awareness plot 620 also comprises a horizon marker 640 which indicates the extent of the area that may be viewed visually by the user of the head mounted display system 100. Real watercraft 310 is inside the viewable area, and so is indicated inside horizon marker 640 by watercraft identification information 320. Watercraft 670 and aircraft 680 are outside of the field of view of the user of the head mounted display system 100 and so are located outside of the horizon marker 640. Watercraft 670 and aircraft 680 may be detected by a radar system or a sonar system, or any other suitable system.

The awareness plot 620 also comprises a detection extent marker 650 which indicates the range of the detection means.

The awareness plot 620 allows for the field of view of the user of the head mounted display system 100 to be extended to be beyond what is visible to them. This may allow for the safety of the watercraft to be improved, as it allows for the user to have a better understanding of the environment.

The awareness plot 620 is illustrated as being circular, but it may have any shape. The shape of the horizon marker 640 and the detection extent marker 650 may reflect the shape of the field of view of the user and the detection range, and therefore may have any shape. For example the horizon may be closer when there are obstructions such as mountains in view. Similarly, the detection means may not have the same range in all directions.

The awareness plot 620 is illustrated as being two-dimensional, but it may be three-dimensional. For example it may be spherical or cylindrical. As described above, the shape may reflect the extent of the field of view of the user, and the range of the detection means. For example, the detection means may have a different range in water than on land and in the air. The user may also be able to limit or control the shape of the awareness plot 620.

The awareness plot 620 is illustrated as being centred on the watercraft the user is located on, but the user may be able to change the centre of the awareness plot 620. For example, the user may be able to change the centre to be centred on another watercraft or any other desired coordinate.

The user may also be able to control the size of the awareness plot 620 such that it takes up a larger or smaller amount of their view. The user may also be able to move the position of the awareness plot 620 on the display 120. The position may be fixed to a position on the display, such that it moves with the user moving their head, or may be fixed to a positon outside.

The user may also be able to change the field of view of the awareness plot 620, such that they may be provided with a limited field of view, for example be provided with a field of view that is limited to be in front of the watercraft 630.

Figure 7:
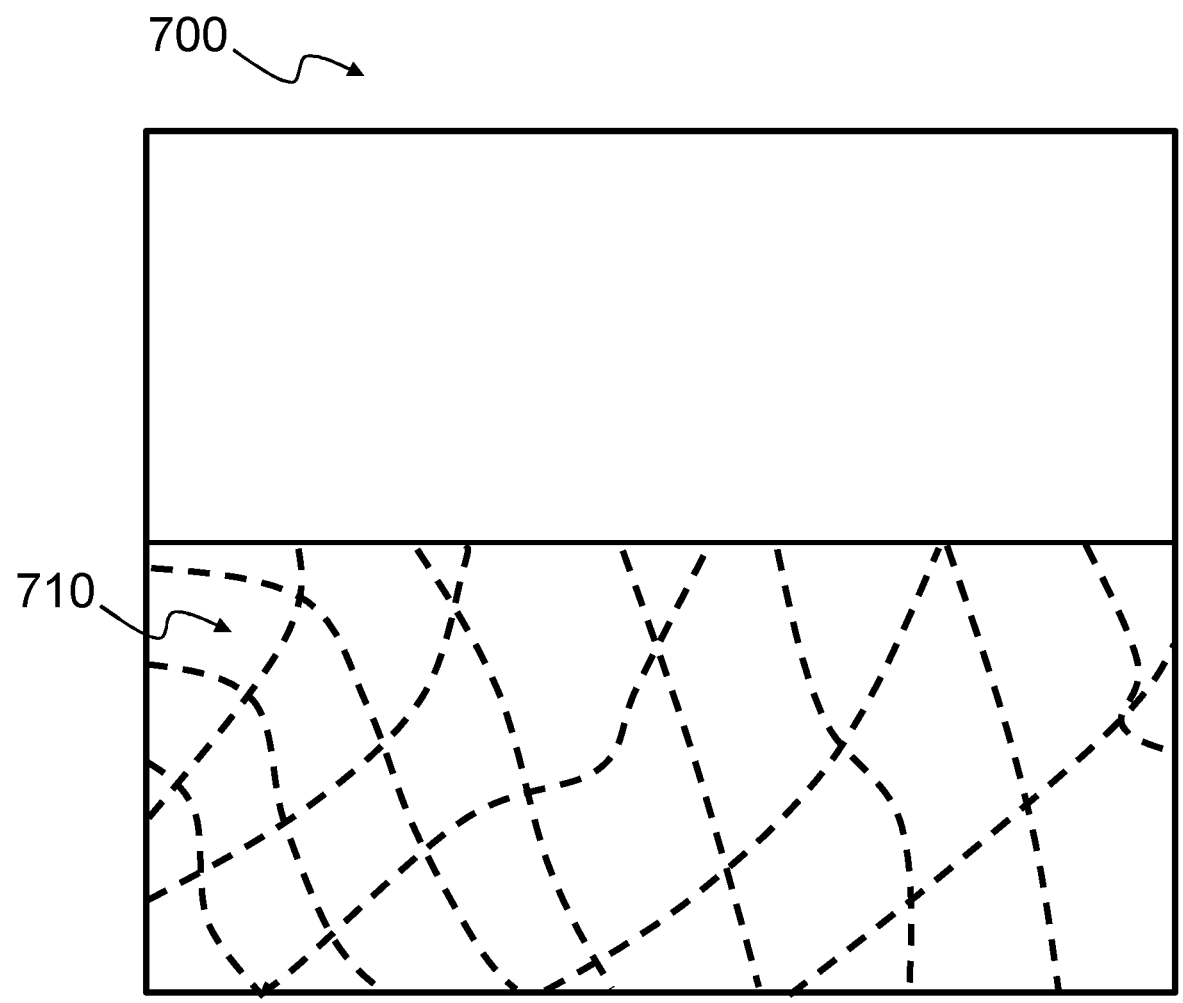
FIG. 7 illustrates a terrain information scene viewed through a head mounted display according to some examples.

FIG. 7 illustrates sub-terrain scene 700. Terrain information 710 may be overlaid over the surface of the water, such that the user is able to see the underwater terrain. The terrain information may show the contours of the land, and any potential hazards or obstructions. Showing terrain information may be particularly useful for watercraft that are substantially under the surface of the water, such as for submarines. This may enable the user of the head mounted display to have an accurate understanding of their surroundings and hazards and/or features of interest.

In some examples the graphical information may comprise a synthetic dockside. This may allow the user of the head mounted display system to see through the watercraft's hull and other structure which would normally block the view of the user, so that the user can see the dock and other features of the harbour.

In some examples the head mounted display may be used whilst a watercraft is being replenished with resources, or other scenarios which require close formation of watercraft. The graphical information in these examples may comprise information regarding the relative motion of the watercraft in the formation and/or information related to an inter-ship connection. The inter-ship connection may be a connection which allows resources to be transferred from one watercraft to another watercraft. The information related to the inter-ship connection may comprise a transfer rate of a resource, a predicted time remaining for the transfer, and/or a synthetic illustration of the inter-ship connection such that the inter-ship connection is viewable through structures which would otherwise block sight of the inter-ship connection. The resource may comprise fuel, and/or stores.

In some examples the watercraft may comprise a watercraft suitable for aircraft operations, such as a watercraft with an aircraft landing platform, or the watercraft may comprise an aircraft carrier. In these examples, the graphical information may comprise a presentation of local air traffic, such that local air traffic is viewable through obstructions, or viewable when the local aircraft would otherwise be beyond visible range.

Figure 8:
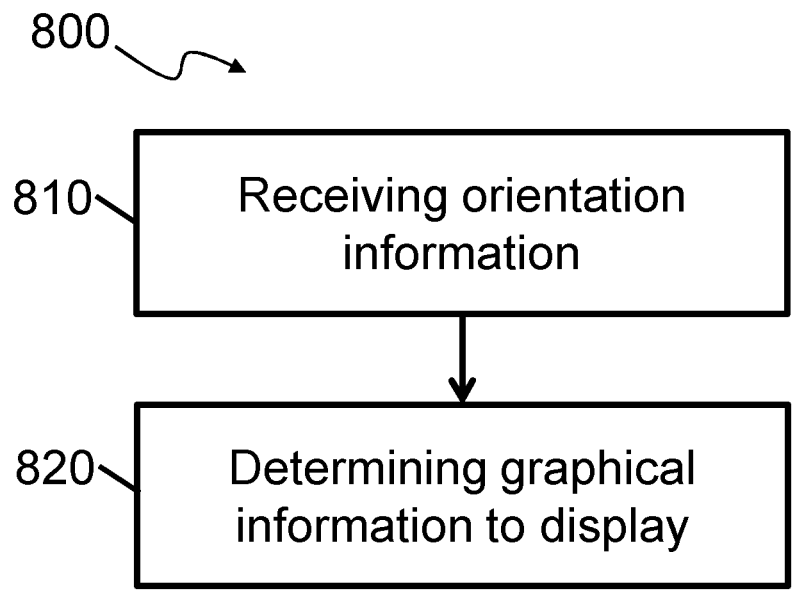
FIG. 8 illustrates a method to determine graphical information to display according to some examples.
Figure 9:
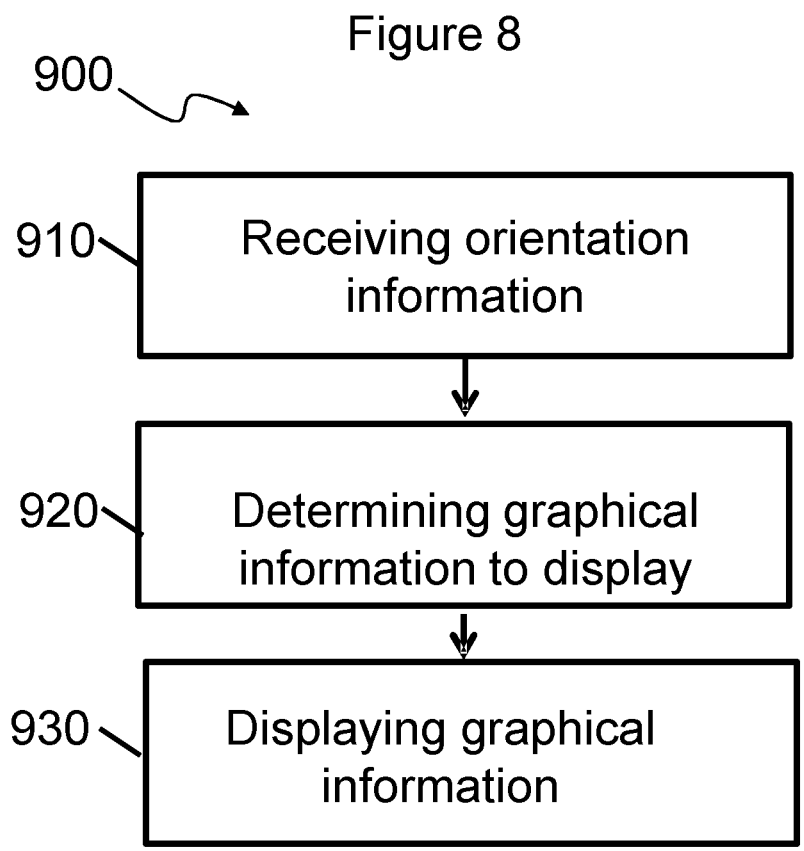
FIG. 9 illustrates a method to display graphical information according to some examples.

FIG. 8 illustrates a method 800 in accordance with some examples. The method may be performed by a processing means. The processing means may be integrated with the head mounted display, or may be separate to the head mounted display. The method 800 comprises receiving orientation information 810, and determining graphical information to display 820 based on sensor data and the orientation of the head mounted display, the sensor data provided by at least one data source associated with the watercraft. The method may also comprise outputting the graphical information to be displayed by a display 120 of a head mounted display system 100, as shown in FIG. 9.

The circuitry to determine orientation information of a head mounted display system relative to the watercraft may comprise a tracking system as described in relation to FIGS. 10 to 14.

Figure 10:
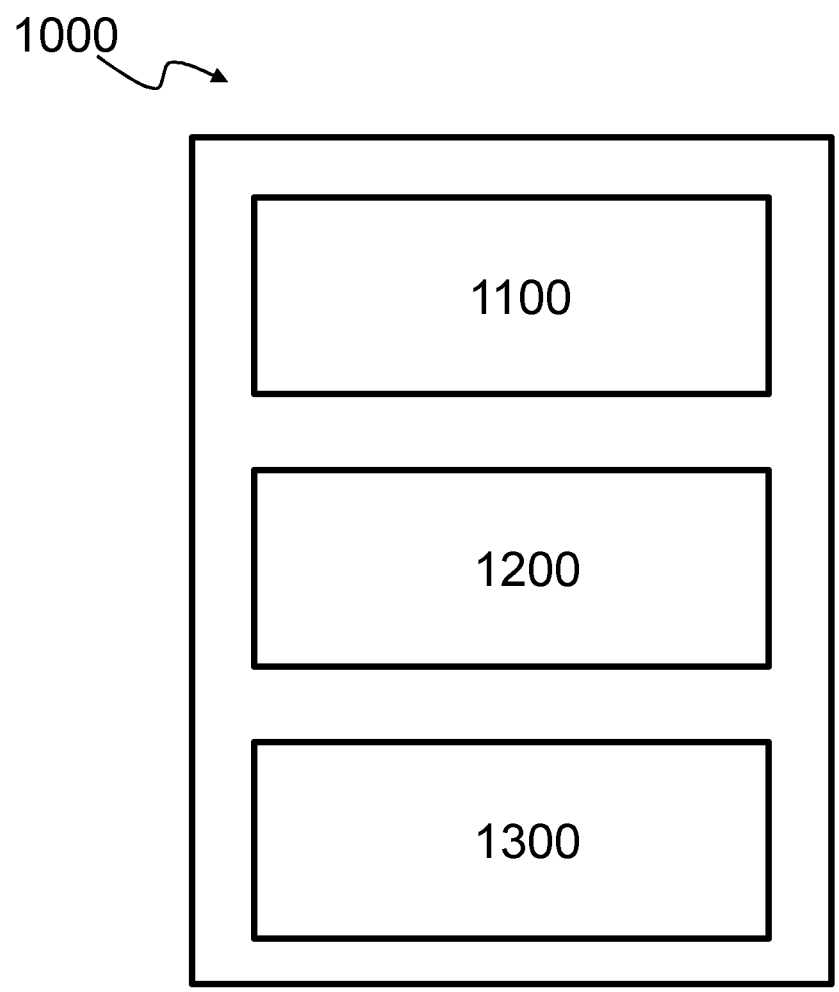
FIG. 10 illustrates a tracking system in accordance with some examples.

FIG. 10 illustrates a tracking system 1000 according to some examples. Head tracking system 1000 is for use with a head mounted display to track the head and/or the eyes of a user of the head mounted display on a watercraft. The tracking system 1000 comprises optical tracking circuitry 1100, non-optical tracking circuitry 1200 and correction circuitry 1300.

The optical tracking circuitry 1100 determines first tracking information of the head mounted display using optical tracking means. The optical tracking means may comprise at least one optical source, such as a laser or light emitting diode, and at least one optical detector. The at least one optical source may be located on the head mounted display, or alternatively the optical detectors may be located on the head mounted display.

Non-optical tracking circuitry comprises a set of non-optical means to provide second tracking information. The set of non-optical tracking means may comprise at least one inertial sensor. The head mounted display may comprise at least one inertial sensor attached to or associated with the head mounted display, and also the watercraft may also comprise at least one inertial sensor attached to or associated with the watercraft.

Correction circuitry 1300 uses the first and second tracking information to provide updated tracking information.

In some examples the tracking system 1000 may further comprise a prediction circuitry. The prediction circuitry may incorporate additional data from sources such as sensors, accelerometers and gyroscopes to improve the perceived latency and conformal accuracy of the head mounted display and use such data to predict the gaze direction of the user. In some examples the sensors, accelerometers and gyroscopes may be associated and/or mounted to the head mounted display. In some examples the sensors, accelerometers and gyroscopes may be associated and/or mounted to the watercraft. The prediction circuitry may preferably predict the position and gaze no more than 100 ms in advance.

In some examples the prediction circuitry may use a combination of information received from data sources associated with the watercraft and data sources associated with head mounted display. The data sources associated with the watercraft may comprise sensors, accelerometers and gyroscopes mounted to the watercraft. The data sources associated with the head mounted display may comprise sensors, accelerometers and gyroscopes mounted to the head mounted display. This combination may improve the perceived latency and accuracy of symbol conformity to objects.

For example, the watercraft may have a predictable motion due to roll caused by the motion of the sea and this information, combined with information regarding the movement of the head of the user of the head mounted display, further reduces the perceived latency.

The particular non-optical tracking means from the set of non-optical tracking means are selected by the tracking system 1000 based on the location of the head mounted display. The tracking system 1000 may select one or more than one non-optical tracking means. Selecting the non-optical tracking means based on the location of the head mounted display may allow the tracking system 1000 to track the head mounted display over a large area.

In some examples the tracking system 1000 selects a non-optical tracking means based on the location of the head mounted display. This is further illustrated by FIG. 11.

Figure 11:
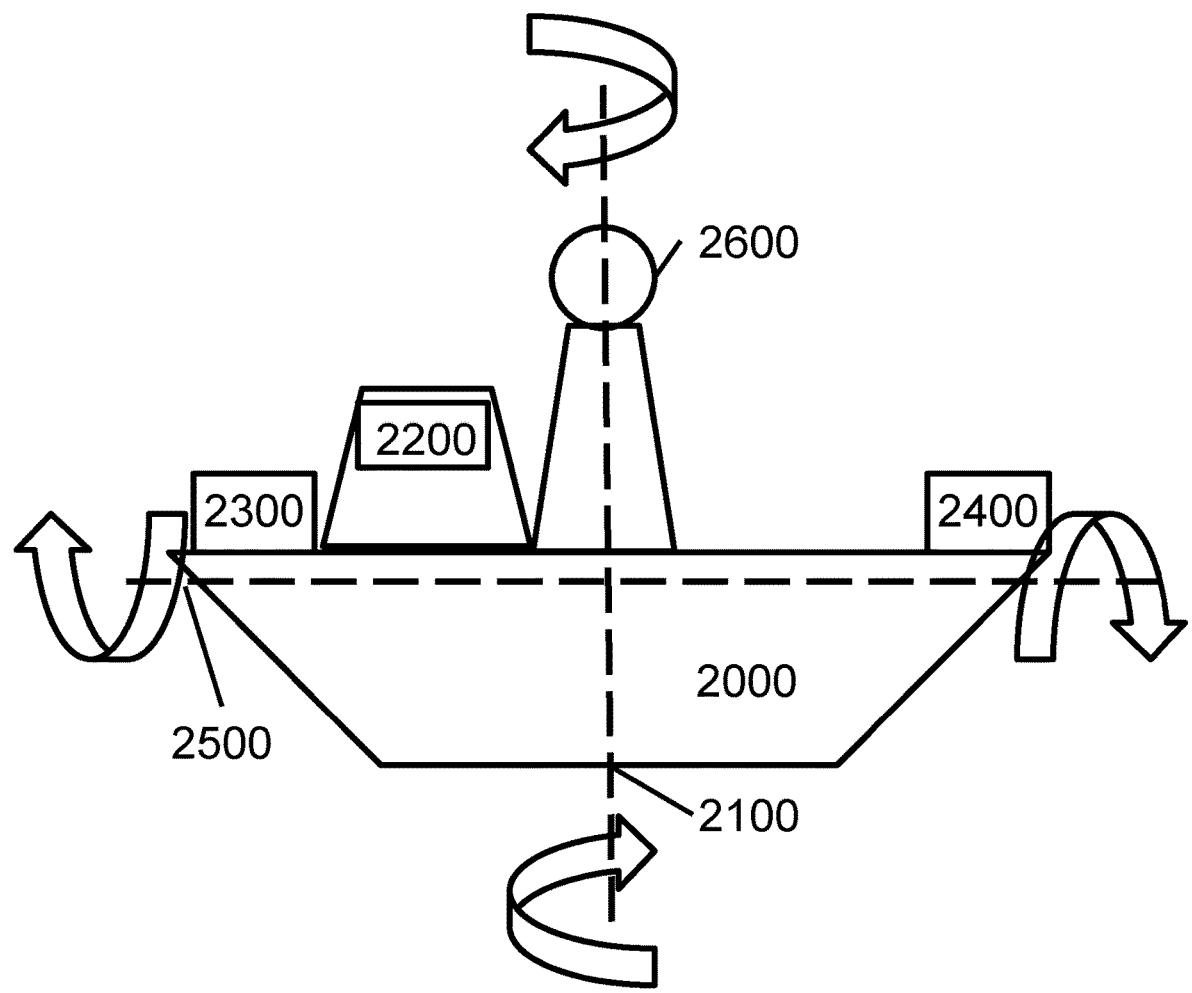
FIG. 11 illustrates a watercraft in accordance with some examples.

FIG. 11 illustrates a tracked watercraft 2000 according to some examples. The tracked watercraft 2000 comprises a first axis 2100 and a second axis 2500 about which the tracked watercraft 2000 may be deformed, for example a flex, rotation, or a compression. The tracked watercraft 2000 may comprise other axes not shown in FIG. 11 that it is also deformed about. Tracked watercraft 2000 also comprises a first tracking location 2200, second tracking location 2300, and third tracking location 2400. The tracked watercraft may also comprise a reference area 2600. The first tracking location 2200, second tracking location 2300, and third tracking location 2400 are each areas of the tracked watercraft that the user may be tracked.

Non-optical tracking means may be provided at least at the reference area 2600. Reference area 2600 may be chosen as a positon or area on the tracked watercraft 2000 that is known to have the least deformation. In some examples, knowing conditions regarding the tracked watercraft may allow for a calculation to be made regarding the relative movement of the first tracking location 2200, second tracking location 2300, and third tracking location 2400, and therefore a correction may be made to the second tracking information based on the location of the user.

In some examples, at least one of the first tracking location 2200, second tracking location 2300, and third tracking location 2400 may comprise a non-optical tracking means. This may be in addition to the non-optical tracking means in the reference area 2600. The selection of the non-optical tracking means may be based on the location of the head mounted display, such that the tracker system 1000 uses non-optical tracking means associated with the first tracking location 2200 when nearest the first tracking location, uses non-optical tracking means associated with the second tracking location 2300 when nearest the second tracking location, and uses non-optical tracking means associated with the third tracking location 2300 when nearest the third tracking location.

The selection of the appropriate non-optical tracking means may not be based purely on distance. For example, the tracked watercraft 2000 may be known to have more flex at a certain location, and therefore the distance may be a weighted distance based on the predicted deformation of the tracked watercraft.

In some examples the deformation behaviour of the watercraft may be known, for example by modelling or physical measurements. This may enable the calculation of the second tracking information to be adapted based on the current location of the user of the head tracking system. This may counteract the fact that when the user is a distance from an inertial sensor located on the vehicle, the motion of the user may be different from the motion of the inertial sensor in a predictable manner due to deformation of the vehicle.

The tracker system may also take into account the motion of at least two of the first tracking location 2200, second tracking location 2300, third tracking location 2400, and reference area 2600 such that for a known position on the watercraft 2000 a movement relative to the reference movement can be determined based on known properties of the tracked watercraft 2000.

The number of tracking areas is illustrative, and the tracked watercraft 2000 may comprise any number of tracked areas. In some examples the tracked areas may be discrete, such that they have defined boundaries. In some examples the tracked areas may be continuous, such that there is not a well-defined boundary. In some examples none or at least one of the tracked areas may overlap. In some examples at least one of the tracking locations may comprise a bridge of the watercraft.

In some examples the non-optical tracking means may comprise at least one inertial sensor. The non-optical tracking means may comprise a set of inertial sensors to measure movement of the helmet relative to the watercraft, and a plurality of sets of inertial sensors to measure the movement of the watercraft relative to the surroundings. The tracking system may select one of the plurality of sets of inertial sensors based on the location of the head mounted display. The plurality of sets of inertial sensors may be disjoint sets, such that each set does not share any sensor with any other set of inertial sensors.

In some examples, the optical tracking means may comprise a size-variable optical tracking mark. The physical size of the size-variable optical tracking mark may be configured to change based on the location of the head mounted display. The physical size may be based on the distance from the size-variable optical tracking mark, or from a defined position in the watercraft or tracking area. The distance may also be a weighted distance. In some examples the size of the size-variable optical tracking mark may vary such that the apparent size from the location of the head mounted display appears to be substantially the same irrespective of the distance from the size-variable optical tracking mark.

Figure 12:
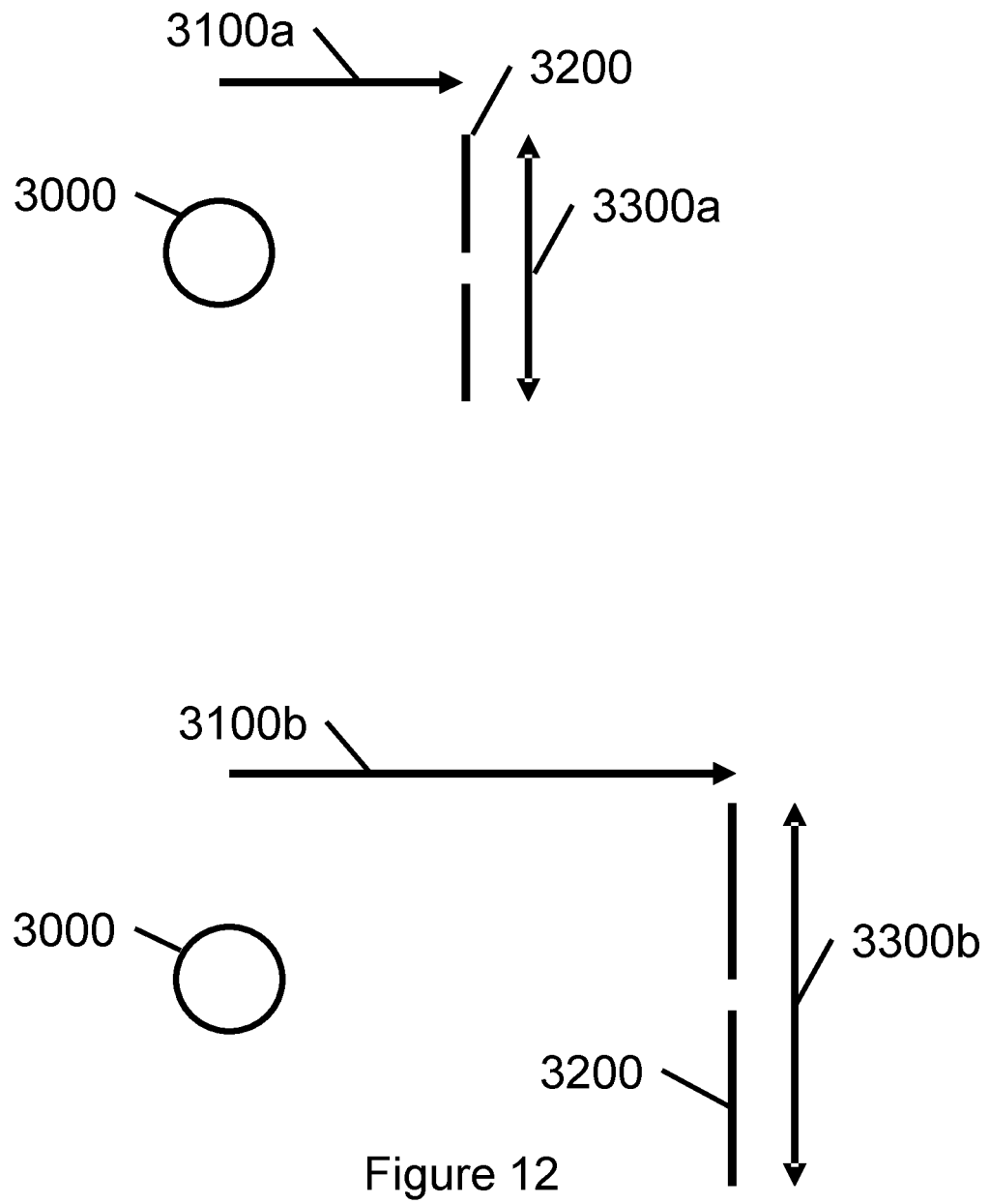
FIG. 12 illustrates a size-variable optical mark in use.

FIG. 12 illustrates the size-variable optical tracking mark in use. A head mounted display 3000 is located at a first distance 3100*a* from the size-variable optical tracking mark 3200. This results in the size-variable optical tracking mark 3200 having a first size 3300*a*. When the head mounted display 3000 is located at a second distance 3100*b* from the size-variable optical tracking mark 3200 the size-variable optical tracking mark 3200 has a second size 3300*b*.

The size-variable optical tracking mark may vary size mechanically, such as by expanding, contracting or a rotation.

The optical tracking marks may comprise an active device, such as a light source, or a passive device such as a reflector or a detector.

Figure 13:
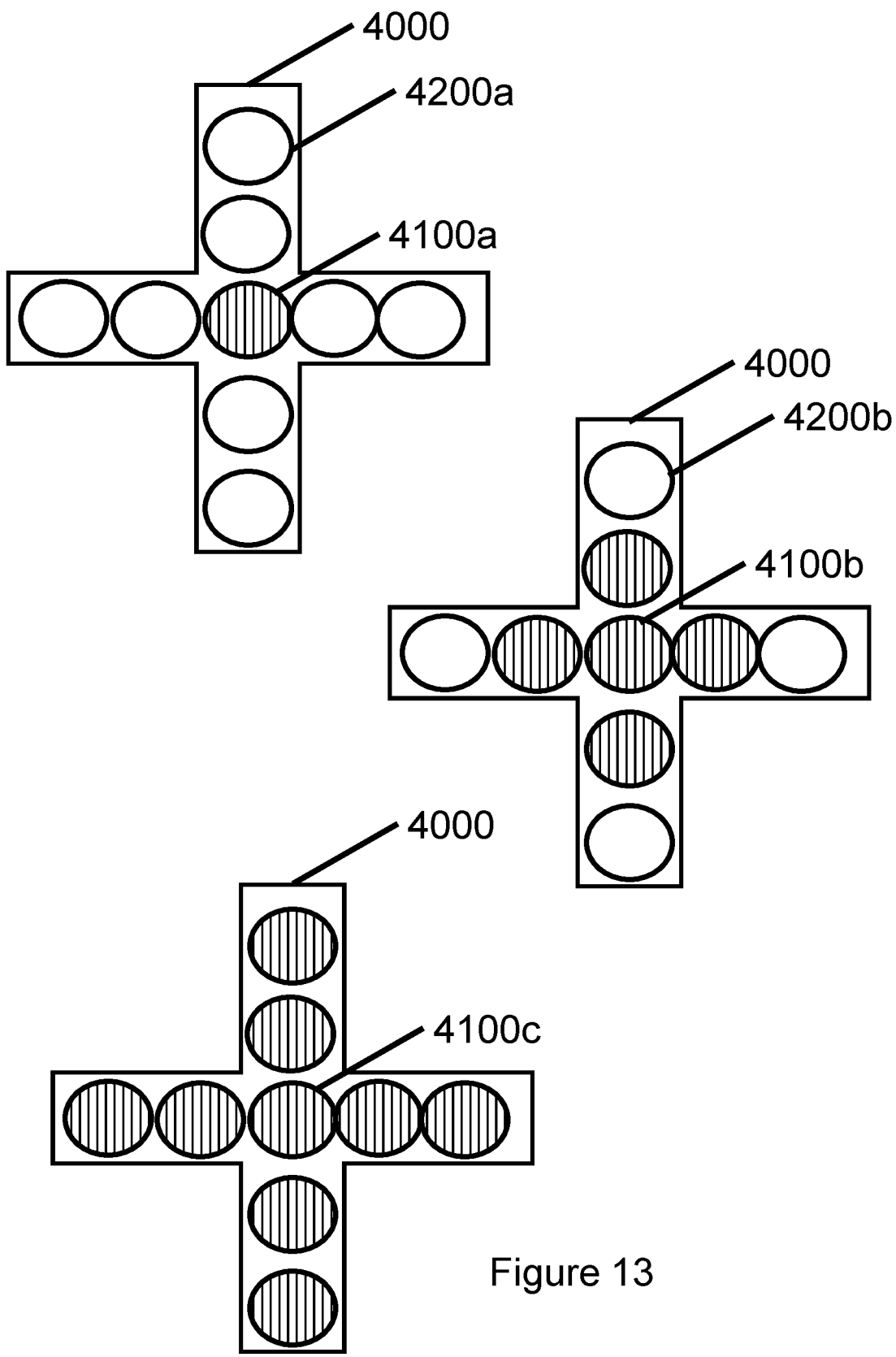
FIG. 13 further illustrates a size-variable optical mark in use.

FIG. 13 illustrates a cross-shaped size-variable optical tracking mark 4000 according to some examples. The shape is illustrative, and it is understood that the size-variable optical tracking mark may have any shape. Furthermore, the size-variable optical tracking mark may be configured to increase size in all angles, rather than vertically and horizontally.

If the head mounted display is located at a first distance from the cross-shaped size-variable optical tracking mark 4000, then a single optical tracking mark 4100*a* may be used by the tracker system and six optical tracking marks not used 4200*a*. If the head mounted display is located at a second distance from the cross-shaped size-variable optical tracking mark 4000 then a further four optical tracking marks may be used 4100*b*, and four optical tracking marks not used 4200*b*, wherein the first distance is less than the second distance. If the head mounted display is located at a third distance from the cross-shaped size-variable optical tracking mark 4000 then a further four optical tracking marks may be used 4100*c*, and no optical tracking marks not used, wherein the third distance is more than the second and first distances.

The tracking system may also comprise a plurality of size-variable optical tracking marks and a plurality of constant-size optical tracking marks which do not change size. For example, the walls of the tracked area may comprise size-variable optical tracking marks as the user may move towards and away from the walls, but the ceiling may comprise constant-size optical tracking marks as the user may not significantly change the distance from the ceiling to the head mounted display, at least in the vertical direction.

The size-variable optical tracking marks are illustrated as increasing size from the centre; however, they are not limited to increasing in this manner. The number of size-variable marks is not required to increase with distance of the user from the marks. In some examples the number of size-variable tracking marks may stay constant, such that the spacing of the marks increase with increasing distance of the user from the marks.

In some examples the intensity of the marks may depend on the distance of the user from the mark. In some examples the intensity of the mark may be relatively constant with distance.

Figure 14:
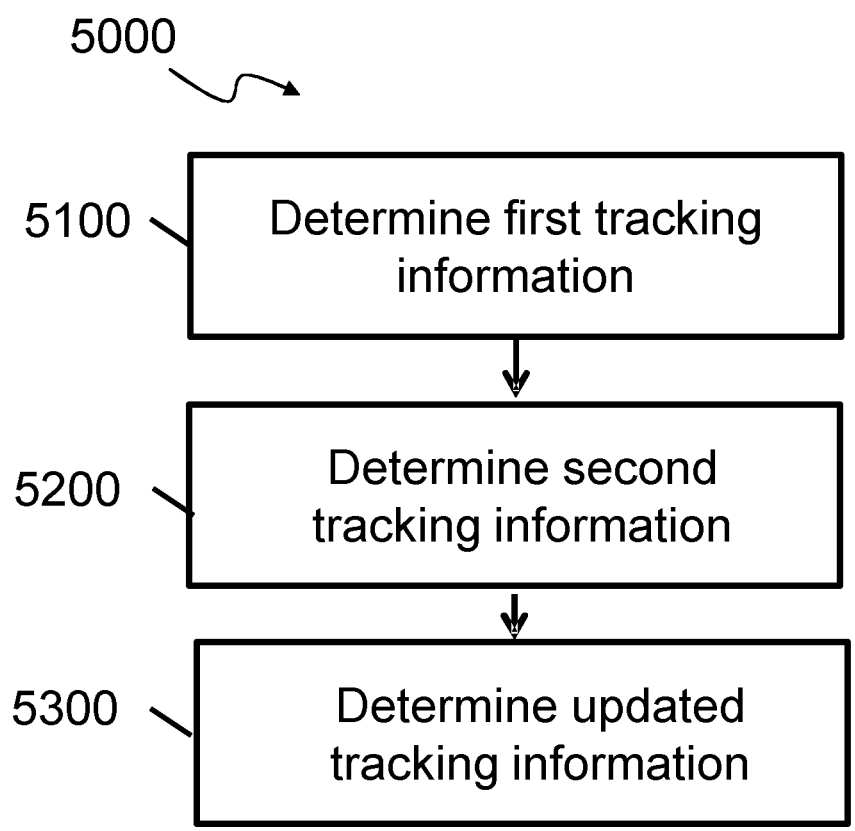
FIG. 14 illustrates a method for use with a tracking system in accordance with some examples.

FIG. 14 illustrates a method 5000 according to some examples. The method comprises determining first tracking information 5100, determining second tracking information 5200, and determining updated tracking information 5300.

Determining first tracking information 5100 comprises using optical tracking means to determine the first tracking information. The optical tracking means may comprise at least one optical sensor and at least one optical source. The optical detectors may be located on the head mounted display, or the optical sources may be located on the head mounted display.

Determining second tracking information 5200 comprises using non-optical tracking means to determine the second tracking information.

The selection of at least one of the optical tracking means and non-optical tracking means may be based on the location of the head mounted display.

In some examples the method may comprise selecting a non-optical tracking means based on the location of the head mounted display. A watercraft may comprise a plurality of tracked areas, and the selecting the non-optical tracking means may comprise selecting a subset of the non-optical tracking means, the subset of the non-optical tracking means being closest to the head mounted display.

In some examples the method may comprise providing the location of the head mounted display to the optical means, and basing the size of the variable-sized marks on the distance from the variable-sized mark to the head mounted display. The location of the head mounted display may be a rough estimation. In some examples the tracking system may determine the location by performing a measurement. In some examples the location may be a relative location, such that the location provides information regarding the distance from the size-variable optical tracking mark but does not provide the absolute location of the head mounted display on the watercraft.

Although the description is described in relation to a watercraft, it is to be understood that the system and method may be equally applicable to any vehicle, such as a land based vehicle or aircraft. Watercraft as used in the description may refer to any type of craft that operates on or in water, such as a boat, ship, submarine, or hovercraft. It is to be understood that this list is not exhaustive.

In some examples a tracking system for use with a head mounted display on a watercraft is disclosed, the tracking system comprising:
  optical tracking circuitry to determine first tracking information of the head mounted display using optical tracking means;
  non-optical circuitry to determine second tracking information of the head mounted display using at least one non-optical tracking means of a set of non-optical tracking means;
  correction circuitry to determine an updated tracking information of the head mounted display based on the first tracking information and the second tracking information; and wherein
  the tracking system is configured to select the at least non-optical tracking means of the set of non-optical tracking means based on a location of the head mounted display.

In some examples the non-optical tracking means comprises a plurality of disjoint sets of inertial sensors located on the watercraft, each individual set comprising at least one inertial sensor, each set located in separate locations of the watercraft, wherein the selection of which of the plurality of sets of inertial sensors to use to determine the second tracking information is based on the location of the head mounted display.

In some examples the optical tracking means comprises at least one size-variable optical tracking mark, a physical size and configuration of the variable-sized alignment mark is based on the location of the head mounted display.

In some examples the size-variable optical tracking mark comprises at least one light source.

In some examples the at least one light source comprises a light emitting diode.

In some examples the non-optical circuitry is configured to adapt the determination of the second tracking information based on an estimate of the physical deformation at the location of the head mounted display.

In some examples the estimate of the physical deformation is based upon non-optical tracking means at at least two separate locations.

In some examples the tracking system further comprises gaze prediction circuitry.

In some examples a watercraft comprises the tracking system according to some examples.

In some examples a method for use with a tracking system comprises:
  determining first tracking information of a head mounted display based on optical tracking means;
  determining second tracking information of a head mounted display based on at least one non-optical tracking means of a set of non-optical tracking means;
  determining an updated tracking information of the head mounted display based on the first tracking information and the second tracking information; and wherein
  selecting the at least one non-optical tracking means to use to determine the second tracking information is based on a location of the head mounted display.

In some examples the non-optical tracking means comprises a plurality of disjoint sets of inertial sensors located on the watercraft, each individual disjoint set comprising at least one inertial sensor, each disjoint set located in separate locations of the watercraft, and selecting the at least one optical tracking means comprises selecting one of the disjoint sets of inertial sensors based on the location of the head mounted display.

In some examples the optical tracking means comprises at least one variable-sized mark, a size and configuration of the variable-sized alignment mark is based on the location of the head mounted display.

In some examples determining the second tracking information is based on an estimate of the physical deformation at the location of the head mounted display.

In some examples the estimate of the physical deformation is based upon non-optical tracking means at at least two separate locations In some examples a machine readable medium comprising instructions is disclosed, that when executed, cause a processing means to perform the method according to some examples.

The invention claimed is:

1. A head mounted display system for use on a watercraft, the head mounted display system comprising:
   circuitry to determine orientation information of the head mounted display system; and
   a display configured to superimpose graphical information in a field of view of at least one eye of a user of the head mounted display system, the graphical information based on sensor data and the orientation information, the sensor data provided by at least one data source associated with the watercraft,
   wherein the graphical information comprises a head gaze information bar superimposed and fixed to a position in outside scenery around the watercraft such that the head gaze information bar does not move relative to the position in the outside scenery when the user moves their head or when the watercraft moves, the head gaze information bar indicating a bearing the user is currently looking at, and further indicating at least one of:
   a watercraft marker indicating a bearing of a watercraft located in the outside scenery, and an off-view marker and an indicating arrow indicating that the watercraft located in the outside scenery or other feature of interest is outside of the field of view.

2. The system according to claim 1, wherein the graphical information comprises a suggested path avoiding a surface hazard in the field of view and/or a sub-surface hazard in the field of view.

3. The system according to claim 1, wherein the graphical information comprises a three-dimensional plot indicating positions of features of interest relative to a location of the watercraft, the features of interest being based on sensor data from the watercraft.

4. The system according to claim 1, wherein the graphical information comprises a predicted path of a feature of interest.

5. The system according to claim 4, wherein the graphical information comprises a suggested path avoiding a surface hazard in the field of view and/or a sub-surface hazard in the field of view.

6. The system according to claim 1, wherein the graphical information comprises undersea information to provide an indication of undersea features.

7. The system according to claim 6, wherein the undersea information comprises a terrain map.

8. The system according to claim 1, wherein at least part of the graphical information is conformal to real objects.

9. The system according to claim 1, wherein the circuitry to determine orientation information of the head mounted display system comprises a tracking system, the tracking system including:
   optical tracking circuitry to determine first tracking information of the head mounted display system using at least one optical source; and
   non-optical circuitry to determine second tracking information of the head mounted display system using at least one inertial sensor.

10. The system according to claim 9, wherein the non-optical tracking circuitry determines the second tracking information using a plurality of disjoint sets of inertial sensors located on the watercraft, each of the sets of inertial sensors comprising at least one inertial sensor, each of the sets of inertial sensors being located in one or more separate locations of the watercraft, wherein selection of which of the sets of inertial sensors to use to determine the second tracking information is based on movement of the head mounted display system relative to the one or more separate locations of the watercraft where each of the sets of inertial sensors is located and a movement of each of the sets of inertial sensors relative to surroundings of the watercraft, and wherein the surroundings of the watercraft are based on sensor data from one or more of: radar, sonar, Global Navigation Satellite Systems, or a sensor system associated with the watercraft.

11. The system according to claim 9, wherein the optical tracking circuitry comprises a size-variable optical tracking mark.

12. The watercraft comprising the head mounted display system according to claim 1.

13. A method comprising:
   receiving, using a processor, orientation information of a head mounted display system; and
   determining, using the processor, graphical information to display on a display of the head mounted display system based on sensor data and the orientation information, the sensor data provided by at least one data source associated with a watercraft,
   wherein the graphical information comprises a head gaze information bar superimposed and fixed to a position in outside scenery around the watercraft such that the head gaze information bar does not move relative to the position in the outside scenery when the user moves their head or when the watercraft moves, the head gaze information bar indicating a bearing the user is currently looking at, and further indicating at least one of:
   a watercraft marker indicating a bearing of a watercraft located in the outside scenery, and an off-view marker and an indicating arrow indicating that the watercraft located in the outside scenery or other feature of interest is outside of the field of view.

14. The method according to claim 13, wherein the graphical information comprises:
   a suggested path avoiding a surface hazard in the field of view and/or a sub-surface hazard in the field of view,
   a three-dimensional plot indicating positions of features of interest relative to a location of the watercraft, wherein the features of interest are based on sensor data from the watercraft,
   a predicted path of features of interest,
   head gaze heading information superimposed and fixed to scenery around the watercraft,
   undersea information to provide an indication of undersea features, and/or
   an undersea terrain map.

15. A non-transitory machine-readable medium comprising instructions, that when executed by one or more processors, cause a process to be carried out, the process comprising:
   receiving, by the one or more processors, orientation information of a head mounted display system; and
   determining, by the one or more processors, graphical information to display on a display of the head mounted display system based on sensor data and the orientation information, the sensor data provided by at least one data source associated with a watercraft,
   wherein the graphical information comprises a head gaze information bar superimposed and fixed to a position in outside scenery around the watercraft such that the head gaze information bar does not move relative to the position in the outside scenery when the user moves their head or when the watercraft moves, the head gaze information bar indicating a bearing the user is currently looking at, and further indicating at least one of:
   a watercraft marker indicating a bearing of a watercraft located in the outside scenery, and an off-view marker and an indicating arrow indicating that the watercraft located in the outside scenery or other feature of interest is outside of the field of view.

16. The non-transitory machine-readable medium according to claim 15, wherein the graphical information comprises a three-dimensional plot indicating positions of features of interest relative to a location of the watercraft, the features of interest obtained from radar and other sensors associated with the watercraft.

17. The non-transitory machine-readable medium according to claim 15, wherein the graphical information comprises: a predicted path of features of interest; and/or a suggested path that avoids the predicted path of the features of interest.

18. The non-transitory machine-readable medium according to claim 15, wherein the graphical information comprises: head gaze heading information, undersea information to provide an indication of undersea features, and/or an undersea terrain map.

19. The watercraft comprising the non-transitory machine-readable medium according to claim 15.

* * * * *